(12) United States Patent
Elfström et al.

(10) Patent No.: US 12,143,160 B2
(45) Date of Patent: Nov. 12, 2024

(54) SYSTEM AND METHOD FOR ALIGNMENT MEASUREMENT OF AN ARRAY ANTENNA SYSTEM

(71) Applicant: Telefonaktiebolaget LM Ericsson (publ), Stockholm (SE)

(72) Inventors: Torbjörn Elfström, Fjärås (SE); Lars Persson, Åsa (SE); Christer Engdahl, Särö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 619 days.

(21) Appl. No.: 17/416,256

(22) PCT Filed: Dec. 18, 2018

(86) PCT No.: PCT/EP2018/085621
§ 371 (c)(1),
(2) Date: Jun. 18, 2021

(87) PCT Pub. No.: WO2020/125958
PCT Pub. Date: Jun. 25, 2020

(65) Prior Publication Data
US 2022/0077939 A1    Mar. 10, 2022

(51) Int. Cl.
*H04B 17/12*    (2015.01)
*G01S 5/02*    (2010.01)
(Continued)

(52) U.S. Cl.
CPC ............ *H04B 17/12* (2015.01); *G01S 5/0221* (2013.01); *G01S 5/0226* (2013.01); *H01Q 3/267* (2013.01); *H04B 17/21* (2015.01)

(58) Field of Classification Search
CPC .... G01S 5/0221; G01S 5/0226; G01S 5/0247; H01Q 3/267; H04B 17/12; H04B 17/21
See application file for complete search history.

(56) References Cited

U.S. PATENT DOCUMENTS

2015/0358071 A1* 12/2015 Chang ............... H04B 7/18504
370/325
2016/0282462 A1* 9/2016 Pitts ..................... G01S 13/426
(Continued)

FOREIGN PATENT DOCUMENTS

CN    105572487 A    5/2016
CN    108574496 A    9/2018
(Continued)

OTHER PUBLICATIONS

International Search Report and the Written Opinion of the International Searching Authority, issued in corresponding International Application No. PCT/EP2018/085621, dated Aug. 26, 2019, 10 pages.

*Primary Examiner* — Thien M Le
(74) *Attorney, Agent, or Firm* — Rothwell, Figg, Ernst & Manbeck, P.C.

(57) ABSTRACT

The present disclosure relates to a system (1) for measurement of antenna alignment of an array antenna system (2) used for wireless communication. The array antenna system (2) has an antenna position (A) relative a first coordinate system (18) and comprises a control unit (3) and an array antenna (4) having an antenna aperture plane (19), a certain coverage (5) and an initial array antenna orientation (B). The array antenna (4) further comprises a plurality of antenna elements (6) and at least two antenna ports (7, 8, 9, 10), each antenna port (7, 8, 9, 10) being connected to a corresponding subarray (11, 12, 13, 14), each subarray (11, 12, 13, 14) comprising at least one antenna element (6). The system (1) comprises the array antenna system (2) and an unmanned aerial vehicle (15). UAV, arranged to be deployed in the coverage (5) and comprising a UAV antenna arrangement (16) and a positioning module (17) that is adapted to provide UAV position information (C) relative the first coordinate system (18). In at least one UAV position (C), the UAV (15)

(Continued)

is adapted to transmit a UAV signal to the array antenna (4) by means of the UAV antenna arrangement (16), the UAV signal comprising the UAV position information (C). The control unit (3) is adapted to detect signals corresponding to the received UAV signal at the antenna ports (7, 8, 9, 10), and to determine a determined array antenna orientation (D) by means of determined phase differences between the detected signals, the antenna position (A), the initial array antenna orientation (B) and the UAV position information (C).

12 Claims, 7 Drawing Sheets

(51) Int. Cl.
*H01Q 3/26* (2006.01)
*H04B 17/21* (2015.01)

(56) References Cited

U.S. PATENT DOCUMENTS

| | | | |
|---|---|---|---|
| 2016/0380692 A1 | 12/2016 | Jalali et al. | |
| 2017/0059688 A1* | 3/2017 | Gan | G01S 3/325 |
| 2017/0155456 A1 | 6/2017 | Wennerlöf et al. | |
| 2017/0300855 A1* | 10/2017 | Lund | B64C 39/024 |
| 2017/0301989 A1 | 10/2017 | Wu et al. | |
| 2018/0062727 A1* | 3/2018 | Savage | H01Q 19/062 |
| 2018/0115065 A1* | 4/2018 | Valdes Garcia | H04B 17/12 |
| 2019/0208112 A1* | 7/2019 | Kleinbeck | G01R 29/0892 |
| 2020/0412426 A1* | 12/2020 | Nilsson | H01Q 3/2605 |

FOREIGN PATENT DOCUMENTS

| | | |
|---|---|---|
| CN | 108896957 A | 11/2018 |
| WO | 2017063695 A1 | 4/2017 |

* cited by examiner

X1
Deploying UAV

X2
Transmitting UAV signal

X3
Detecting received signals

X4
Determining a determined array antenna orientation

X41
Determining first vector and second vector

X42
Determining error angle between vectors

FIG. 8

SYSTEM AND METHOD FOR ALIGNMENT MEASUREMENT OF AN ARRAY ANTENNA SYSTEM

CROSS REFERENCE TO RELATED APPLICATION(S)

This application is a 35 U.S.C. § 371 National Phase Entry Application from PCT/EP2018/085621, filed Dec. 18, 2018, designating the United States, the disclosure of which is incorporated herein by reference in its entirety.

TECHNICAL FIELD

The present disclosure relates to a system for alignment measurement of an array antenna system.

BACKGROUND

Active Antenna Systems (AAS) is an important part of LTE (Long Term Evolution) and an essential part of 5G. AAS is a generic term that is often used to describe base stations that incorporate a large number of separate transmitters, receivers and antenna elements that can be used for MIMO (Multiple Input Multiple Output) and beamforming as an integrated product. This will be one of the key aspects of 5G as the industry moves higher up in frequency and more complex array antenna geometries are needed to achieve the desired link budget.

At present, AAS:s are starting to be deployed out in the field by many operators, and early indications show that they will be deployed in big numbers. For example hard winds and/or mechanical impact can change the orientation of an AAS, thereby impacting specific AASs coverage areas, hence changing what was intended when doing the cell-planning. This will most likely degrade system performance and possibly disturb other systems.

Up until now, manual visual inspection or monitoring with advanced GNSS (Global Navigation Satellite System) based electronic sensors have been carried out to detect if orientation of an antenna has changed. Monitoring with electronic sensors typically use multiple GNSS receivers with separated antennas together with phase shifter and some other equipment, using phase difference between the GNSS receivers to calculate orientation. Both solutions can be very costly, since the antennas are numerous and often located in remote and/or hard to reach places and GNSS based solution have a high manufacturing cost. GNSS based systems are furthermore susceptible for interference from the base stations operating at neighboring frequencies.

There can also be demands on alignment accuracy, which demands are provided and controlled by authorities.

Other systems can be based on mechanical sensors as well as on accelerometers and gyros.

There is thus a need to have a cost efficient and easy to use system and method to measure the orientation of an AAS or another array antenna system used for wireless communication, enabling the system to run optimally while avoiding disturbance of other systems.

SUMMARY

It is an object of the present disclosure to provide a system and method for measurement of antenna alignment of an array antenna system used for wireless communication.

Said object is obtained by means of a system for measurement of antenna alignment of an array antenna system used for wireless communication. The array antenna system has an antenna position relative a first coordinate system and comprises a control unit and an array antenna having an antenna aperture plane, a certain coverage and an initial array antenna orientation. The array antenna further comprises a plurality of antenna elements and at least two antenna ports, each antenna port being connected to a corresponding subarray, each subarray comprising at least one antenna element. The system comprises the array antenna system and an unmanned aerial vehicle (UAV) arranged to be deployed in the coverage and comprising a UAV antenna arrangement and a positioning module that is adapted to provide UAV position information relative the first coordinate system. In at least one UAV position, the UAV is adapted to transmit a UAV signal to the array antenna by means of the UAV antenna arrangement, the UAV signal comprising the UAV position information. The control unit is adapted to detect signals corresponding to the received UAV signal at the antenna ports, and to determine a determined array antenna orientation by means of determined phase differences between the detected signals, the antenna position, the initial array antenna orientation and the UAV position information.

Having knowledge of the array antenna orientation makes it possible to enable a communication network, in which the array antenna system is a part, to operate as it was optimized for during an initial cell planning process. Furthermore, disturbance of other systems located in the vicinity of the array antenna system is avoided.

According to some aspects, the control unit is adapted to determine a transformed first vector and a second vector, both vectors being defined relative a second coordinate system that is associated with the array antenna system. The transformed first vector indicates an expected pointing direction from the antenna aperture plane towards the UAV position, and the second vector indicates a determined pointing direction from the antenna aperture plane towards the UAV position. The control unit is adapted to determine an error angle between the vectors.

In this way, an error angle is obtained, indicating whether there is a deviation from the expected pointing direction.

According to some aspects, the control unit is adapted to determine the transformed first vector by means of a transformation of a first vector in the first coordinate system to the second coordinate system. The first vector indicates a determined pointing direction from the antenna aperture plane towards the UAV position in the first coordinate system and is determined by means of the antenna position and the UAV position information. The transformation is performed by means of the initial array antenna orientation and the antenna position.

According to some aspects, the second vector is comprised in the determined array antenna orientation, where the control unit is adapted to issue an alert signal when the comparison results in a discrepancy exceeding a certain threshold, where the discrepancy comprises the error angle.

In this way, a deviation from an expected orientation is indicated.

According to some aspects, the determined array antenna orientation comprises at least one angle and the initial array antenna orientation comprises at least one angle.

According to some aspects, the antenna system is an active antenna system (AAS).

According to some aspects, the system further comprises a network monitoring system.

This object is also obtained by means of methods that are associate with the above advantages.

BRIEF DESCRIPTION OF THE DRAWINGS

The present disclosure will now be described more in detail with reference to the appended drawings, where:

FIG. 8 illustrates a system according to some aspects of the present disclosure.

DETAILED DESCRIPTION

Figure 1:
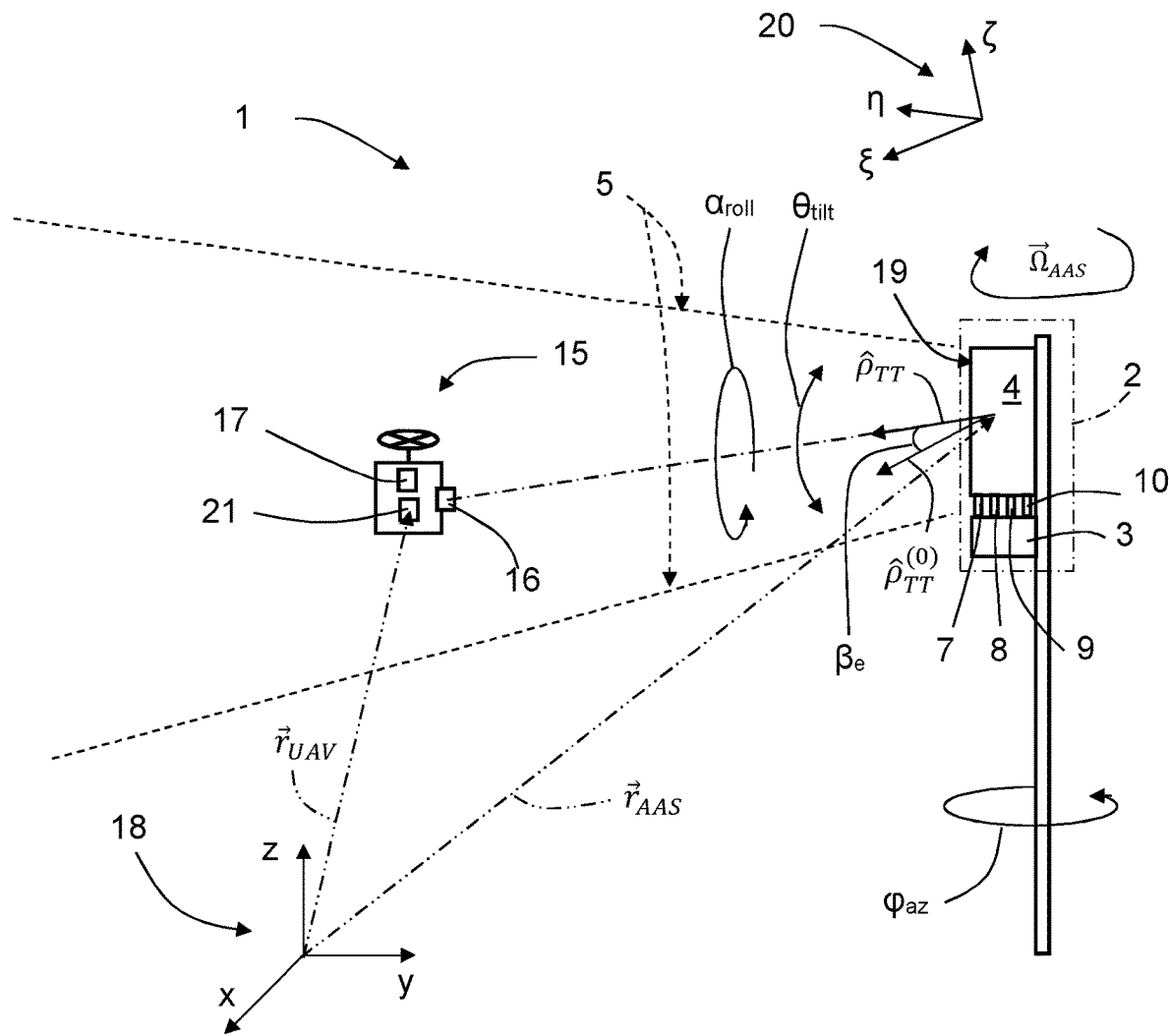
FIG. 1 schematically shows a front view of an antenna system and an unmanned aerial vehicle.

Aspects of the present disclosure will now be described more fully hereinafter with reference to the accompanying drawings. The different devices, systems, computer programs and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

Figure 2:
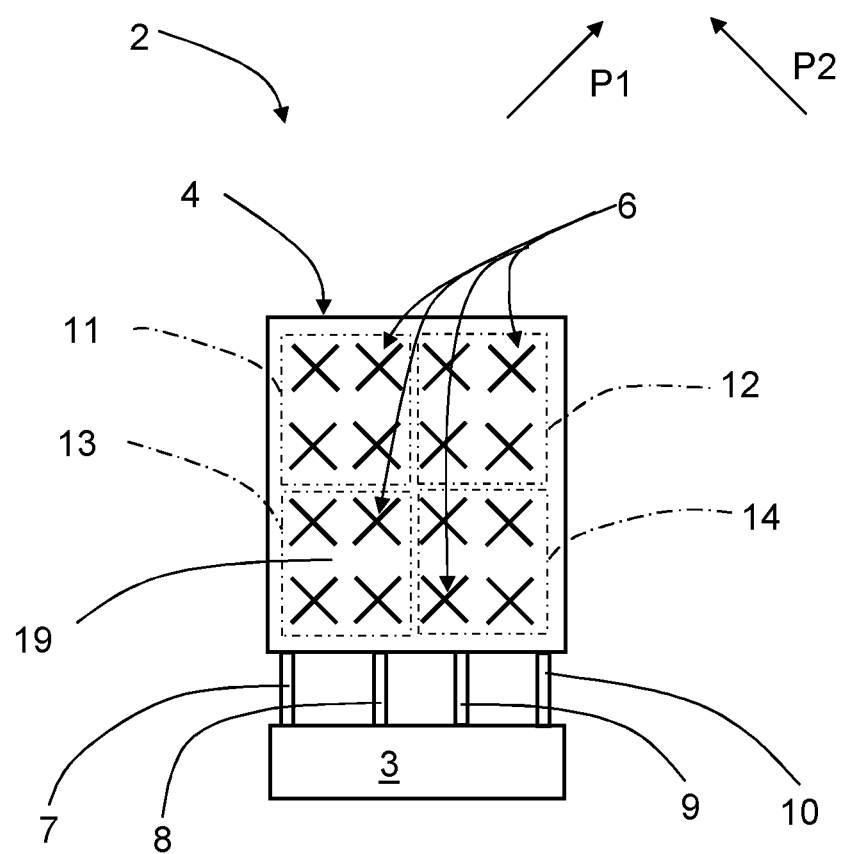
FIG. 2 schematically shows a front view of an antenna system.
Figure 3:
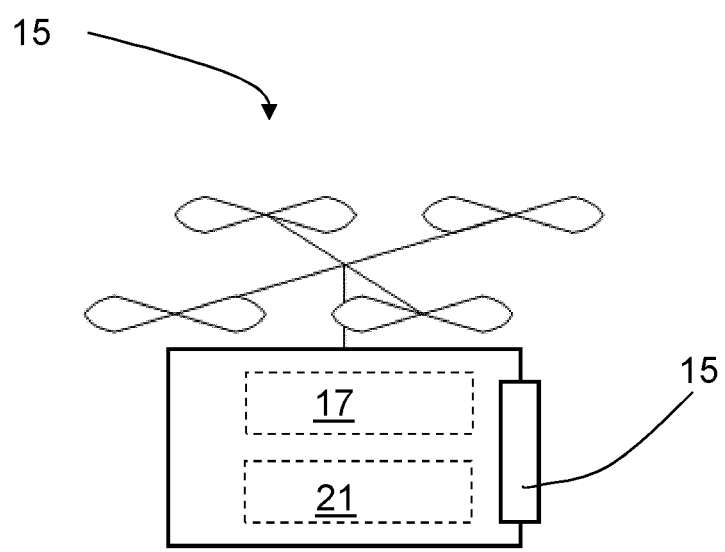
FIG. 3 schematically shows an un-manned aerial vehicle.

With reference to FIG. 1 and FIG. 2 there is an array antenna system 2 used for wireless communication, where the array antenna system 2 comprises a control unit 3 and an array antenna 4. The array antenna has an antenna aperture plane 19 and a certain coverage 5. The array antenna 4 comprises four antenna ports where each antenna port 7, 8, 9, 10 is connected to a corresponding subarray 11, 12, 13, 14. Here, there is a first antenna port 7 that is connected to a first subarray 11, a second antenna port 8 that is connected to a second subarray 12, a third antenna port 9 that is connected to a third subarray 13, and a fourth antenna port 10 that is connected to a third subarray 14. Each subarray comprises four antenna elements 6 (only a few indicated in FIG. 2 for reasons of clarity). According to some aspects, the array antenna system 2 is an active antenna system (AAS).

The array antenna system has an antenna position $\vec{r}_{AAS}$ relative a first coordinate system 18 and an initial array antenna orientation $\vec{\Omega}_{AAS}^{(0)}$. According to some aspects, in this example, the first coordinate system 18 is an earth fixed coordinate system. According to some aspects, the antenna position $\vec{r}_{AAS}$ is referring to a point in the middle of the antenna aperture plane 19.

According to the present disclosure there is a system 1 for measuring antenna alignment of the array antenna system, where the system 1 comprises the array antenna system 2 and an unmanned aerial vehicle 15 (UAV) arranged to be deployed in the coverage 5. The UAV 15 comprises a UAV antenna arrangement 16, a UAV control unit 21, a positioning module 17 that is adapted to provide UAV position information $\vec{r}_{UAV}$ relative the first coordinate system 18. For this purpose, according to some aspects, the positioning module 17 comprises at least one of a GNSS (Global Navigation Satellite System) module and an inertia detecting module which in turn for example can comprise at least one of an accelerometer and a gyro.

As shown in FIG. 1, in a first UAV position $\vec{r}_{UAV}$ that is comprised in the UAV position information, the UAV 15 is adapted to transmit a first UAV signal comprising a first test signal to the array antenna 4 by means of the UAV antenna arrangement 16. According to some aspects, the first UAV signal comprises a test signal and the UAV position information $\vec{r}_{UAV}$, and the control unit 3 is adapted to detect signals corresponding to the received UAV signal at the antenna ports 7, 8, 9, 10. According to some aspects, the UAV position information $\vec{r}_{UAV}$ can constitute the test signal. According to some aspects, the UAV position information $\vec{r}_{UAV}$, can be transmitted in any other manner, such as for example via a separate mobile terminal such as a UE (User Equipment). Suitably, the first UAV signal comprises an initialization sequence that is adapted to prepare the control unit for a measurement of the alignment.

The control unit 3 is further adapted to determine a determined array antenna orientation $\vec{\Omega}_{AAS}$ by means of:

determined phase differences between the detected signals, the antenna position $\vec{r}_{AAS}$, the initial array antenna orientation $\vec{\Omega}_{AAS}^{(0)}$, and the UAV position information $\vec{r}_{UAV}$.

The determined array antenna orientation $\vec{\Omega}_{AAS}$ comprises information regarding the array antenna orientation, where the accuracy of this information depends on how many the number of measurements that are made. According to some aspects, the determined array antenna orientation $\vec{\Omega}_{AAS}$ comprises angles, where each measurement provides a new angle. According to some aspects, the determined array antenna orientation $\vec{\Omega}_{AAS}$ comprises at least one angle and the initial array antenna orientation $\vec{\Omega}_{AAS}^{(0)}$ comprises at least one angle. For example, the determined array antenna orientation $\vec{\Omega}_{AAS}$ comprises an elevation angle $\theta_{tilt}$ and azimuth angle $\varphi_{az}$, which constitutes complete information about the array antenna orientation.

This means that in a second UAV position that is comprised in the UAV position information, the UAV 15 is adapted to transmit a second UAV signal comprising a second test signal and so on.

According to some aspects, the antenna position $\vec{r}_{AAS}$ is either independently measured by a positioning system of the base station or assumed unchanged since previous measurement, and therefore taken to be equal to a value previously known from site deployment or previous measurement, the initial array antenna orientation $\vec{\Omega}_{AAS}^{(0)}$ is previously known from deployment or from an earlier orientation measurement, and the UAV position information comprising the UAV position $\vec{r}_{UAV}$ is provided by the positioning module 17.

This means that the UAV antenna arrangement 16, having the UAV position $\vec{r}_{UAV}$ in the first coordinate system 18, is illuminating the array antenna 4 with a test signal. The array antenna system 2 measures the direction to the test signal in a second coordinate system 20 that is associated with the array antenna system 2, and calculates the present determined array antenna orientation $\vec{\Omega}_{AAS}$ and extracts the deviation compared to the initial array antenna orientation $\vec{\Omega}_{AAS}^{(0)}$. The new values will be stored and reported to a network monitoring function. A threshold is defined for possible deviation, If there is a too large deviation, an alarm signal is activated. This alarm signal indicates that the orientation of the antenna aperture plane 19 is not correct according to previously stored orientation.

In the following, a more detailed example of the above procedure will be presented.

According to some aspects, the control unit is adapted to determine a transformed first vector $\hat{\rho}_{TT}^{(0)}$ and a second vector $\hat{\rho}_{TT}$, both vectors $\hat{\rho}_{TT}^{(0)}$, $\hat{\rho}_{TT}$ being defined relative the second coordinate system 20. The transformed first vector $\hat{\rho}_{TT}^{(0)}$ indicates an expected pointing direction from the antenna aperture plane 19 towards the UAV position $\vec{r}_{UAV}$ as seen from the array antenna 4, and the second vector $\hat{\rho}_{TT}$ indicates a determined pointing direction from the antenna aperture plane 19 towards the UAV position $\vec{r}_{UAV}$. The control unit 3 is adapted to determine an error angle $\beta_e$ between the vectors $\hat{\rho}_{TT}^{(0)}$, $\hat{\rho}_{TT}$. According to some aspects, the possible deviation mentioned above, and the corresponding threshold, is related to the error angle $\beta_e$.

The control unit 3 is according to some aspects adapted to determine the transformed first vector $\hat{\rho}_{TT}^{(0)}$ by means of a transformation of a first vector $\vec{r}_{TT}$ in the first coordinate system 18 to the second coordinate system 20. The first vector $\hat{r}_{TT}$ indicates a determined pointing direction from the antenna aperture plane 19 towards the UAV position $\vec{r}_{UAV}$ in the first coordinate system 18 and is determined by means of the antenna position $\hat{r}_{AAS}$ and the UAV position $\hat{r}_{UAV}$.

According to some aspects, the first vector $\hat{r}_{TT}$ is a vector of unit length, pointing from the antenna aperture plane 19 towards the UAV position $\vec{r}_{UAV}$, and is determined from the antenna position FAAS and the UAV position $\vec{r}_{UAV}$ as:

$$\hat{r}_{TT} = (\vec{r}_{UAV} - \vec{r}_{AAS}) / |\vec{r}_{UAV} - \vec{r}_{AAS}|.$$

The transformation is performed by means of the initial array antenna orientation $\vec{\Omega}_{AAS}^{(0)}$ and the antenna position $\vec{r}_{AAS}$.

The control unit 3 is according to some aspects adapted to determine the second vector $\hat{\rho}_{TT}$ by estimating an angle of arrival for the transmitted UAV signal, which is accomplished by determining phase differences between the detected signals. Phase differences at the antenna ports 7, 8, 9, 10 are thus used for determining the angle of arrival for the transmitted UAV signal. The second vector PTT is thus an actual measured direction vector to the UAV position $\vec{r}_{UAV}$ in the second coordinate system 20.

The error angle $\beta_e$ between the measured pointing direction, the second vector PTT, and the expected pointing direction, the transformed first vector $\hat{\rho}_{TT}^{(0)}$, is according to some aspects calculated using the scalar product, between the vectors $\hat{\rho}_{TT}^{(0)}$, $\hat{\rho}_{TT}$ as:

$$\beta_e = \cos^{-1}(\hat{\rho}_{TT} \hat{\rho}_{TT}^{(0)})$$

As mentioned previously, if the error angle $\beta_e$ exceeds a predefined threshold, an alarm signal is set to inform that the antenna aperture normal have changed. It is also conceivable that an automatic alignment procedure can be initialized, for example by means of servo motors that control the orientation of the array antenna 4, or by means of an UAV that is equipped to control the orientation of the array antenna 4. According to some aspects, an electrical alignment by adapting phase and amplitude fed to each antenna subarray to point antenna beams in desired direction.

Based on the error angle $\beta_e$, the control unit 3 is according to some aspects adapted to further calculate the determined array antenna orientation $\vec{\Omega}_{AAS}$. According to some aspects, the second vector $\hat{\rho}_{TT}$ is comprised in the determined array antenna orientation $\vec{\Omega}_{AAS}$.

Figure 4:
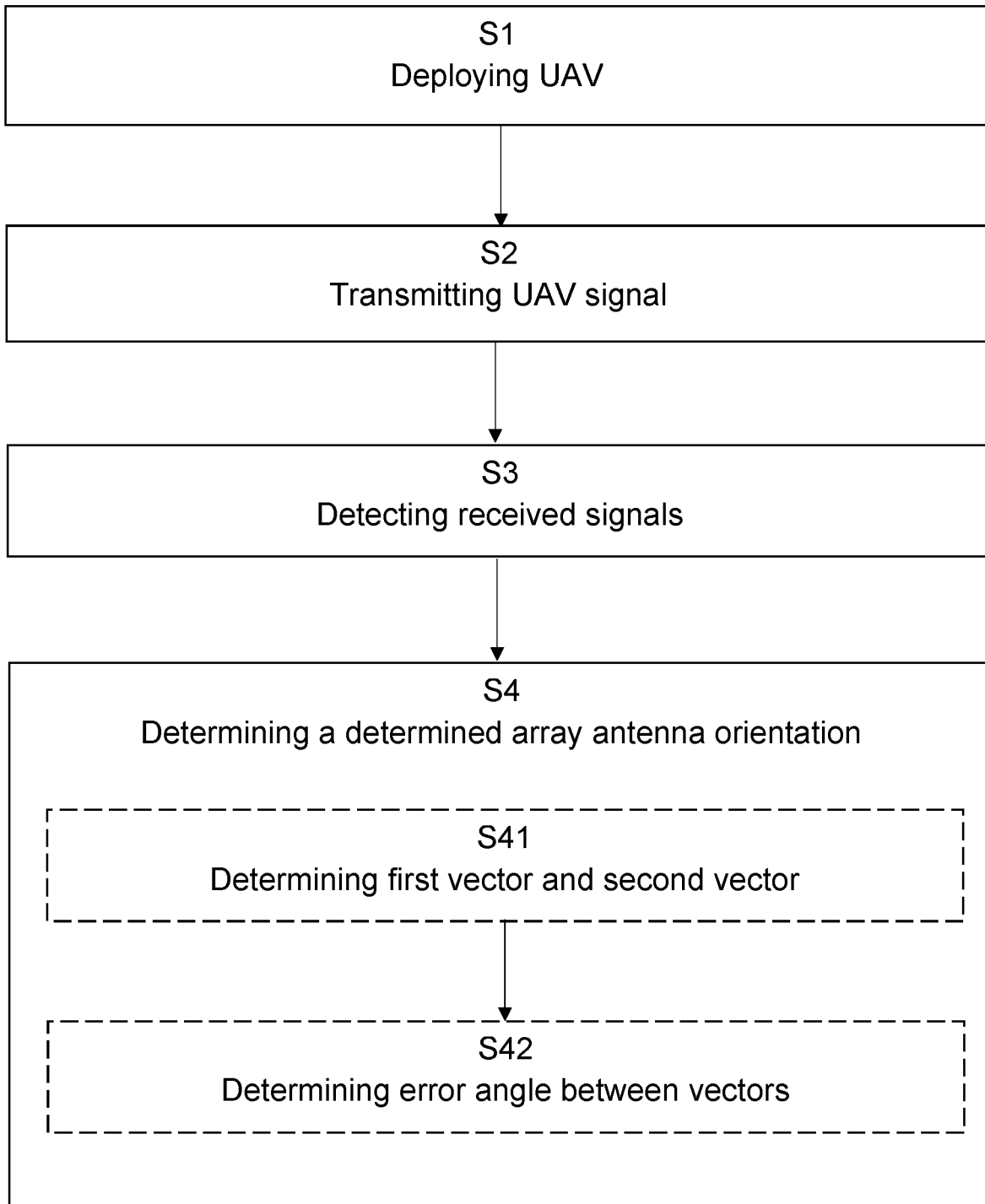
FIG. 4 shows a flowchart of methods according to the present disclosure.

With reference to FIG. 4, the present disclosure relates to system 1 for measuring antenna alignment of an array antenna system 2 used for wireless communication, the array antenna system 2 having an antenna position $\vec{r}_{AAS}$ relative a first coordinate system 18. The array antenna system 2 also has an array antenna 4 with an antenna aperture plane 19, a certain coverage 5 and an initial array antenna orientation $\vec{\Omega}_{AAS}^{(0)}$, the array antenna 4 further having a plurality of antenna elements 6 and at least two antenna ports 7, 8, 9, 10. Each antenna port 7, 8, 9, 10 is connected to a corresponding subarray 11, 12, 13, 14, each subarray 11, 12, 13, 14 having at least one antenna element 6.

The method comprises deploying S1 an unmanned aerial vehicle 15 (UAV) in the coverage 5 and transmitting S2, in at least one UAV position $\vec{r}_{UAV}$ and via a UAV antenna, a UAV signal to the array antenna 4, the UAV signal comprising UAV position $\vec{r}_{UAV}$ information in a first coordinate system 18. The method further comprises detecting S3 signals corresponding to the received UAV signal at the antenna ports 7, 8, 9, 10, and determining S4 a determined array antenna orientation $\hat{\Omega}_{AAS}$ by means of determined phase differences between the detected signals, the antenna position $\vec{r}_{AAS}$, the initial array antenna orientation $\vec{\Omega}_{AAS}^{(0)}$ and the UAV position information $\vec{r}_{UAV}$.

According to some aspects, the method comprises determining S41 a transformed first vector $\hat{\rho}_{TT}^{(0)}$ and a second vector $\hat{\rho}_{TT}$, both vectors $\hat{\rho}_{TT}^{(0)}$, $\hat{\rho}_{TT}$ being defined relative a second coordinate system 20 that is associated with the array antenna system 2. The transformed first vector $\hat{\rho}_{TT}^{(0)}$ indicates an expected pointing direction from the antenna aperture plane 19 towards the UAV position $\vec{r}_{UAV}$, and the second vector $\hat{\rho}_{TT}$ indicates a determined pointing direction from the antenna aperture plane 19 towards the UAV position $\vec{r}_{UAV}$. The method further comprises determining S42 an error angle $\beta_e$ between the vectors $\hat{\rho}_{TT}^{(0)}$, $\hat{\rho}_{TT}$.

According to some aspects, the method comprises determining the transformed first vector pry by means of a transformation of a first vector $\vec{r}_{TT}$ in the first coordinate system 28 to the second coordinate system 20, where the first vector $\vec{r}_{TT}$ indicates a determined pointing direction from the antenna aperture plane 19 towards the UAV position $\vec{r}_{UAV}$ in the first coordinate system 18 and is determined by means of the antenna position $\vec{r}_{AAS}$ and the UAV position information $\vec{r}_{UAV}$, and where the transformation is performed using the initial array antenna orientation $\vec{\Omega}_{AAS}^{(0)}$ and the antenna position $\vec{r}_{AAS}$.

According to some aspects, the second vector $\hat{\rho}_{TT}$ is comprised in the determined array antenna orientation $\vec{\Omega}_{AAS}$, where the control unit 3 is adapted to issue an alert signal when the comparison results in a discrepancy exceeding a certain threshold, where the discrepancy comprises the error angle $\beta_e$.

According to some aspects, the determined array antenna orientation $\vec{\Omega}_{AAS}$ comprises at least one angle and where the initial array antenna orientation $\vec{\Omega}_{AAS}^{(0)}$ comprises at least one angle.

Figure 5:
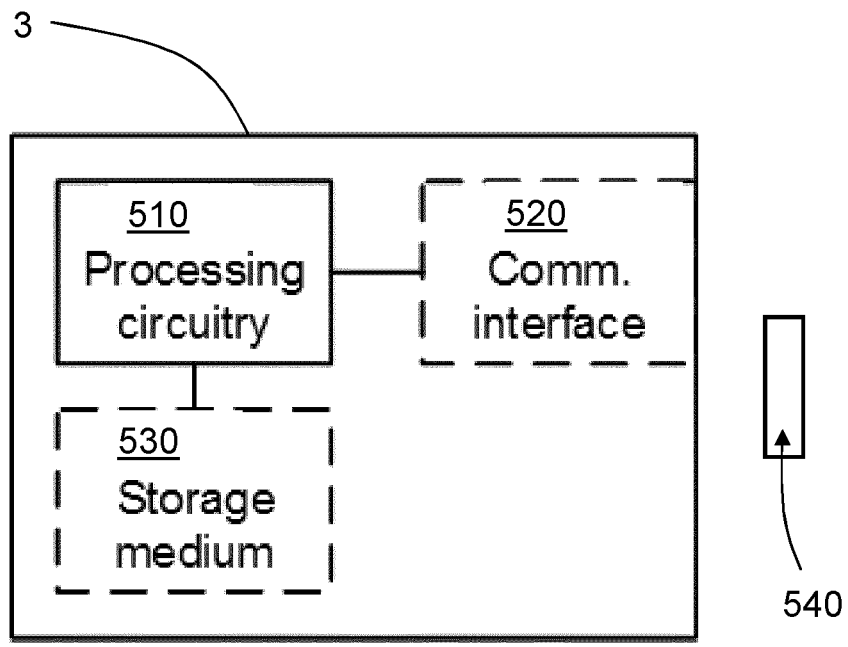
FIG. 5 schematically shows an example of a control unit.

FIG. 5 schematically illustrates a control unit 3 according to aspects of the present disclosure. It is appreciated that the above described methods and techniques may be realized in hardware. This hardware is then arranged to perform the methods, whereby the same advantages and effects are obtained as have been discussed above.

Processing circuitry 510 is provided using any combination of one or more of a suitable central processing unit (CPU), multiprocessor, microcontroller, digital signal processor (DSP), etc., capable of executing software instructions stored in a computer program product, e.g. in the form of a storage medium 530. The processing circuitry 510 may further be provided as at least one application specific integrated circuit (ASIC), or field programmable gate array (FPGA).

Particularly, the processing circuitry 510 is configured to cause the control unit 3 to perform a set of operations, or steps. For example, the storage medium 530 may store the set of operations, and the processing circuitry 510 may be configured to retrieve the set of operations from the storage medium 530 to cause the classification unit to perform the set of operations. The set of operations may be provided as a set of executable instructions. Thus, the processing circuitry 510 is thereby arranged to execute methods as herein disclosed.

The storage medium 530 may also comprise persistent storage, which, for example, can be any single one or combination of magnetic memory, optical memory, solid state memory or even remotely mounted memory.

The control unit 120 may further comprise a communications interface 520 for communications with at least one external device such as an external network monitoring system 540. As such the communication interface 520 may comprise one or more transmitters and receivers, comprising analogue and digital components and a suitable number ports for wireline or wireless communication.

The processing circuitry 510 controls the general operation of the control unit 3, e.g. by sending data and control signals to the communication interface 520 and the storage medium 530, by receiving data and reports from the communication interface 520, and by retrieving data and instructions from the storage medium 530. Other components, as well as the related functionality, of the unit are omitted in order not to obscure the concepts presented herein.

Figure 6:
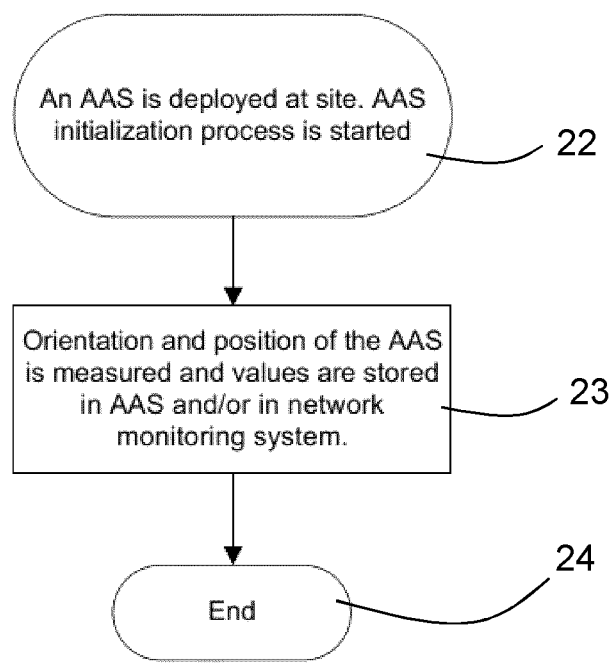
FIG. 6 shows a flowchart of methods according to embodiments.

With reference to FIG. 6, an example of an initialization process is shown. First, an array antenna system such as an AAS is deployed 22. Then values for orientation and position of the array antenna system are determined and stored 23, according to some aspects in the array antenna system and/or in a network monitoring system 540 as shown in FIG. 5. The process is then ended 24.

Figure 7:
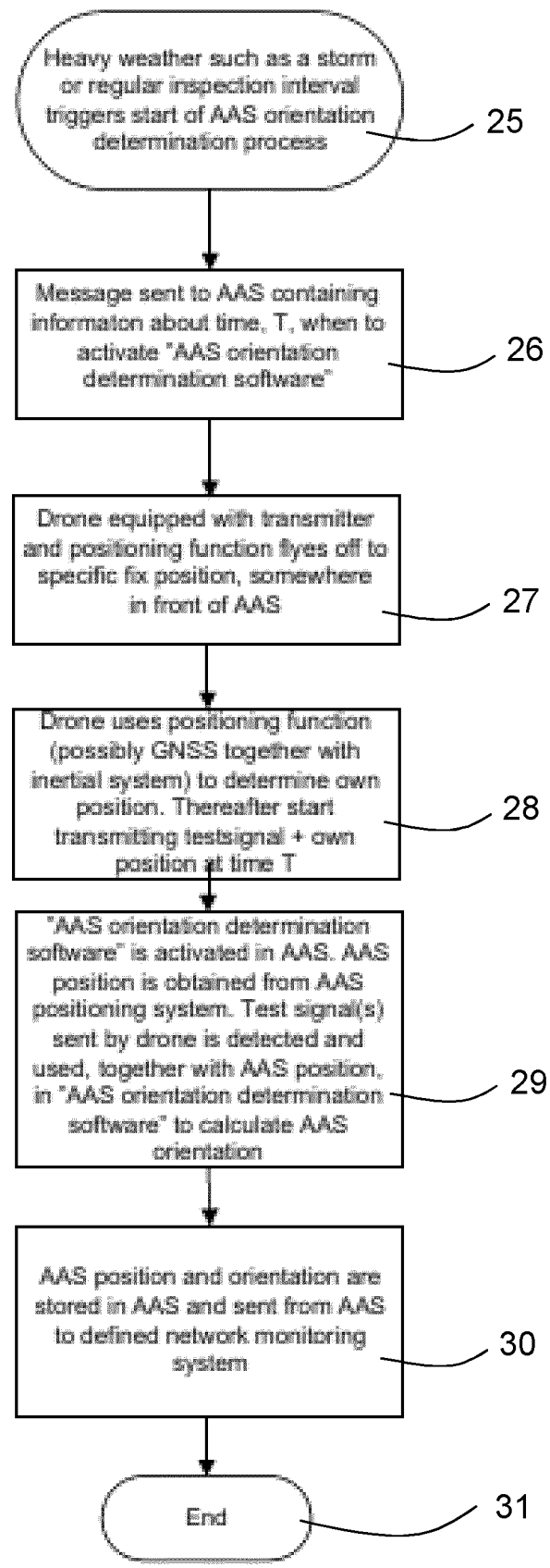
FIG. 7 shows a flowchart of methods according to embodiments.

With reference to FIG. 7, an example of an orientation determination process is shown. First, the orientation determination process is initialized 25, for example being triggered by the occurrence of heavy whether or by a predetermined inspection interval. Then, a message containing information about time T is sent to the array antenna system 26, where the time refers to activation of an orientation determination process that can be realized in software, here exemplified as an "AAS orientation determination software". The software can be realized in the control unit 3 as mentioned above, as well as in an external unit such as an external network server. Then, an UAV, such as a drone, according to the above is deployed 27 in the coverage 5 of the array antenna 4. The UAV uses its positioning module 17 to determine its own UAV position $\vec{r}_{UAV}$, and to then transmit an UAV signal to towards the array antenna 4, where the signal comprises the UAV position $\vec{r}_{UAV}$ at the time T 28. According to some aspects, an AAS position is measured using a positioning function comprised in the AAS.

The orientation determination process is activated in the array antenna system, allowing the UAV signal, comprising a test signal and AAS position, to be detected and used in the orientation determination process 29 in order to calculate the antenna system orientation. The determined array antenna position and orientation $\hat{\Omega}_{AAS}$ are according to some aspects stored 30 in the array antenna system and/or in a network monitoring system 540 as shown in FIG. 5. The process is then ended 31.

Suitably, the UAV 15 is moved to several positions within the coverage 5 and the procedure mentioned above is repeated, such that a more accurate result is obtained. This will be discussed more below.

According to some aspects, the orientation of the second coordinate system 20 relative to the first coordinate system 18 can be described by three rotations; $R_z(\varphi_{az})$, $R_\eta(\theta_{tilt})$, and $R_\xi(\alpha_{roll})$. Here R is a rotation matrix and its index denotes the axis of the rotation. It is here assumed that the z-axis points towards zenith.

By repeating the above procedure three times, i.e. moving the UAV 15 to three positions within the coverage 5 and determine the transformed first vector $\hat{\rho}_{TT}^{(0)}$ and the second vector $\hat{\rho}_{TT}$ at each position, and require that the three rotation angles $\theta_{tilt}$, $\varphi_{az}$, $\alpha_{roll}$ should make the expected directions agree with the measured ones, the following equation system is obtained:

$$\hat{\rho}_{TT,1} = R_\xi(\alpha_{roll}) R_\eta(\theta_{tilt}) R_z(\varphi_{az}) \hat{r}_{TT,1}$$

$$\hat{\rho}_{TT,2} = R_\xi(\alpha_{roll}) R_\eta(\theta_{tilt}) R_z(\varphi_{az}) \hat{e}_{TT,2}$$

$$\hat{\rho}_{TT,3} = R_\xi(\alpha_{roll}) R_\eta(\theta_{tilt}) R_z(\varphi_{az}) \hat{r}_{TT,3}$$

From this equation system, the determined array antenna orientation $\vec{\Omega}_{AAS} = (\varphi_{az}, \theta_{tilt}, \alpha_{roll})$ can be determined.

Here, the UAV position information ($\vec{r}_{UAV}$) thus comprises information regarding the UAV position for these three positions. More or less UAV positions may of course be used depending on required accuracy and available resources.

The present disclosure is not limited to the above, but may vary freely within the scope of the appended claims. For example, there can be any number of antenna ports and subarrays, there is however at least two antenna ports, where each subarray comprises at least one antenna element.

FIG. 8 shows a system used for measuring antenna alignment of an array antenna system 2 used for wireless communication. The array antenna system 2 has an antenna position $\vec{r}_{AAS}$ relative a first coordinate system 18. The array antenna system 2 also has an array antenna 4 with an antenna aperture plane 19, a certain coverage 5 and an initial array antenna orientation $\vec{\Omega}_{AAS}^{(0)}$, the array antenna 4 further having a plurality of antenna elements 6 and at least two antenna ports 7, 8, 9, 10. Each antenna port 7, 8, 9, 10 is connected to a corresponding subarray 11, 12, 13, 14, each subarray 11, 12, 13, 14 having at least one antenna element 6.

The system 1 further comprises:

A deploying unit X1 configured to deploy an unmanned aerial vehicle 15 (UAV) in the coverage 5.

A transmitting unit X2 configured to transmit in at least one UAV position $\vec{r}_{UAV}$ and via a UAV antenna, a UAV signal to the array antenna 4, the UAV signal comprising UAV position $\vec{r}_{UAV}$ information in a first coordinate system 18.

A detecting unit X3 configured to detect signals corresponding to the received UAV signal at the antenna ports 7, 8, 9, 10.

A first determining unit X4 configured to determine a determined array antenna orientation $\hat{\vec{\Omega}}_{AAS}$ by means of determined phase differences between the detected signals, the antenna position $\vec{r}_{AAS}$, the initial array antenna orientation $\vec{\Omega}_{AAS}^{(0)}$ and the UAV position information $\vec{r}_{UAV}$.

According to some aspects, the system 1 further comprises:

A second determining unit X41 configured to determine a transformed first vector $\hat{\rho}_{TT}^{(0)}$ and a second vector $\hat{\rho}_{TT}$, both vectors $\hat{\rho}_{TT}^{(0)}$, $\hat{\rho}_{TT}$ being defined relative a second coordinate system 20 that is associated with the array antenna system 2. The transformed first vector $\hat{\rho}_{TT}^{(0)}$ indicates an expected pointing direction from the antenna aperture plane 19 towards the UAV position $\vec{r}_{UAV}$, and the second vector $\hat{\rho}_{TT}$ indicates a determined pointing direction from the antenna aperture plane 19 towards the UAV position $\vec{r}_{UAV}$.

A second determining unit X42 configured to determine an error angle $\beta_e$ between the vectors $\hat{\rho}_{TT}^{(0)}$, $\hat{\rho}_{TT}$.

Generally, the present disclosure relates to a system 1 for measurement of antenna alignment of an array antenna system 2 used for wireless communication, the array antenna system 2 having an antenna position $\vec{r}_{AAS}$ elative a first coordinate system 18 and comprising a control unit 3 and an array antenna 4 having an antenna aperture plane 19, a certain coverage 5 and an initial array antenna orientation $\hat{\vec{\Omega}}_{AAS}^{(0)}$. The array antenna 4 further comprises a plurality of antenna elements 6 and at least two antenna ports 7, 8, 9, 10, each antenna port 7, 8, 9, 10 being connected to a corresponding subarray 11, 12, 13, 14, each subarray 11, 12, 13, 14 comprising at least one antenna element 6. The system 1 comprises the array antenna system 2 and an unmanned aerial vehicle 15 (UAV) arranged to be deployed in the coverage 5 and comprising a UAV antenna arrangement 16 and a positioning module 17 that is adapted to provide UAV position information $\vec{r}_{UAV}$ relative the first coordinate system 18. In at least one UAV position $\vec{r}_{UAV}$, the UAV 15 is adapted to transmit a UAV signal to the array antenna 4 by means of the UAV antenna arrangement 16, the UAV signal comprising the UAV position information $\vec{r}_{UAV}$. The control unit 3 is adapted to detect signals corresponding to the received UAV signal at the antenna ports 7, 8, 9, 10, and to determine a determined array antenna orientation $\vec{\Omega}_{AAS}$ by means of determined phase differences between the detected signals, the antenna position $\vec{r}_{AAS}$, the initial array antenna orientation $\vec{\Omega}_{AAS}^{(0)}$ and the UAV position information $\vec{r}_{UAV}$.

According to some aspects, the control unit is adapted to determine a transformed first vector $\hat{\rho}_{TT}^{(0)}$ and a second vector $\hat{\rho}_{TT}$, both vectors $\hat{\rho}_{TT}^{(0)}$, $\hat{\rho}_{TT}$ being defined relative a second coordinate system 20 that is associated with the array antenna system 2. The transformed first vector $\hat{\rho}_{TT}^{(0)}$ indicates an expected pointing direction from the antenna aperture plane 19 towards the UAV position $\vec{r}_{UAV}$, and the second vector $\hat{\rho}_{TT}$ indicates a determined pointing direction from the antenna aperture plane 19 towards the UAV position $\vec{r}_{UAV}$. The control unit 3 is adapted to determine an error angle $\beta_e$ between the vectors $\hat{\rho}_{TT}^{(0)}$, $\hat{\rho}_{TT}$.

According to some aspects, the control unit 3 is adapted to determine the transformed first vector $\hat{\rho}_{TT}^{(0)}$ by means of a transformation of a first vector $\vec{r}_{TT}$ in the first coordinate system 28 to the second coordinate system 20. The first vector $\hat{r}_{TT}$ indicates a determined pointing direction from the antenna aperture plane 19 towards the UAV position $\vec{r}_{UAV}$ in the first coordinate system 18 and is determined by means of the antenna position $\vec{r}_{AAS}$ and the UAV position information $\vec{r}_{UAV}$. The transformation is performed by means of the initial array antenna orientation $\vec{\Omega}_{AAS}^{(0)}$ and the antenna position $\vec{r}_{AAS}$.

According to some aspects, the second vector $\hat{\rho}_{TT}$ is comprised in the determined array antenna orientation $\vec{\Omega}_{AAS}$, where the control unit 3 is adapted to issue an alert signal when the comparison results in a discrepancy exceeding a certain threshold, where the discrepancy comprises the error angle $\beta_e$.

According to some aspects, the determined array antenna orientation $\vec{\Omega}_{AAS}$ comprises at least one angle and where the initial array antenna orientation $\vec{\Omega}_{AAS}^{(0)}$ comprises at least one angle.

According to some aspects, the antenna system 2 is an active antenna system (AAS).

According to some aspects, the system further comprises a network monitoring system 540.

The invention claimed is:

1. A system for measurement of antenna alignment of an array antenna system used for wireless communication, the array antenna system having an antenna position ($\vec{r}_{AAS}$) relative a first coordinate system and comprising a control unit and an array antenna having an antenna aperture plane, a certain coverage and an initial array antenna orientation ($\hat{\vec{\Omega}}_{AAS}^{(0)}$), the array antenna further comprising a plurality of antenna elements and at least two antenna ports, each antenna port being connected to a corresponding subarray, each subarray comprising at least one antenna element, the system comprising the array antenna system and an unmanned aerial vehicle, UAV, arranged to be deployed in the coverage and comprising a UAV antenna arrangement and a positioning module that is adapted to provide UAV position information ($\vec{r}_{UAV}$) relative the first coordinate system, wherein, in at least one UAV position ($\vec{r}_{UAV}$), the UAV is adapted to transmit a UAV signal to the array antenna using the UAV antenna arrangement, the UAV signal comprising the UAV position information ($\vec{r}_{UAV}$), where the control unit is adapted to detect signals corresponding to the received UAV signal at the antenna ports, and to determine a determined array antenna orientation ($\vec{\Omega}_{AAS}$) using determined phase differences between the detected signals, the antenna position ($\vec{r}_{AAS}$), the initial array antenna orientation ($\vec{\Omega}_{AAS}^{(0)}$) and the UAV position information ($\vec{r}_{UAV}$).

2. The system according to claim 1, wherein the control unit is adapted to determine a transformed first vector ($\hat{\rho}_{TT}^{(0)}$) and a second vector ($\hat{\rho}_{TT}$), both vectors ($\hat{\rho}_{TT}^{(0)}$, $\hat{\rho}_{TT}$) being defined relative a second coordinate system that is associated with the array antenna system, the transformed first vector ($\hat{\rho}_{TT}^{(0)}$) indicating an expected pointing direction from the antenna aperture plane towards the UAV position ($\hat{r}_{UAV}$), and the second vector ($\hat{\rho}_{TT}$) indicating a determined pointing direction from the antenna aperture plane towards the UAV position ($\vec{r}_{UAV}$), where the control unit is adapted to determine an error angle ($\beta_e$) between the vectors ($\hat{\rho}_{TT}^{(0)}$, $\hat{\rho}_{TT}$).

3. The system according to claim 2, wherein the control unit is adapted to determine the transformed first vector ($\hat{\rho}_{TT}^{(0)}$) using a transformation of a first vector ($\vec{r}_{TT}$) in the first coordinate system to the second coordinate system, where the first vector ($\hat{r}_{TT}$) indicates a determined pointing direction from the antenna aperture plane towards the UAV position ($\vec{r}_{UAV}$) in the first coordinate system and is determined using the antenna position ($\vec{r}_{AAS}$) and the UAV position information ($\vec{r}_{UAV}$), and where the transformation is performed using the initial array antenna orientation ($\vec{\Omega}_{AAS}^{(0)}$) and the antenna position ($\vec{r}_{AAS}$).

4. The system according to claim 2, wherein the second vector ($\hat{\rho}_{TT}$) is comprised in the determined array antenna orientation ($\vec{\Omega}_{AAS}$), where the control unit is adapted to issue an alert signal when the comparison results in a discrepancy exceeding a certain threshold, where the discrepancy comprises the error angle ($\beta_e$).

5. The system according to claim 4, wherein the determined array antenna orientation ($\vec{\Omega}_{AAS}$) comprises at least one angle and where the initial array antenna orientation ($\vec{\Omega}_{AAS}^{(0)}$) comprises at least one angle.

6. The system according to claim 1, wherein the antenna system is an active antenna system, AAS.

7. The system according to claim 1, wherein the system further comprises a network monitoring system.

8. A method in a system for measuring antenna alignment of an array antenna system used for wireless communication, the array antenna system having an antenna position ($\vec{r}_{AAS}$) relative a first coordinate system and having an array antenna with an antenna aperture plane, a certain coverage and an initial array antenna orientation ($\vec{\Omega}_{AAS}^{(0)}$), the array antenna further having a plurality of antenna elements and at least two antenna ports, each antenna port being connected to a corresponding subarray, each subarray having at least one antenna element, the method comprising:

deploying an unmanned aerial vehicle, UAV, in the coverage;

transmitting, in at least one UAV position ($\vec{r}_{UAV}$), and via a UAV antenna, a UAV signal to the array antenna, the UAV signal comprising UAV position ($\vec{r}_{UAV}$) information in a first coordinate system;

detecting signals corresponding to the received UAV signal at the antenna ports; and determining a determined array antenna orientation ($\vec{\Omega}_{AAS}$) using determined phase differences between the detected signals, the antenna position ($\vec{r}_{AAS}$), the initial array antenna orientation ($\vec{\Omega}_{AAS}^{(0)}$) and the UAV position information ($\vec{r}_{UAV}$).

9. The method according to claim 8, wherein the method comprises determining a transformed first vector ($\hat{\rho}_{TT}^{(0)}$) and a second vector ($\hat{\rho}_{TT}$), both vectors ($\hat{\rho}_{TT}^{(0)}$, $\hat{\rho}_{TT}$) being defined relative a second coordinate system that is associated with the array antenna system, the transformed first vector ($\hat{\rho}_{TT}^{(0)}$) indicating an expected pointing direction from the antenna aperture plane towards the UAV position ($\vec{r}_{UAV}$), and the second vector ($\hat{\rho}_{TT}$) indicating a determined pointing direction from the antenna aperture plane towards the UAV position ($\vec{r}_{UAV}$), where the method further comprises determining an error angle ($\beta_e$) between the vectors ($\hat{\rho}_{TT}^{(0)}$, $\hat{\rho}_{TT}$).

10. The method according to claim 9, wherein the method comprises determining the transformed first vector ($\hat{\rho}_{TT}^{(0)}$) using a transformation of a first vector ($\hat{r}_{TT}$) in the first coordinate system to the second coordinate system, where the first vector ($\hat{r}_{TT}$) indicates a determined pointing direction from the antenna aperture plane towards the UAV position ($\vec{r}_{UAV}$) in the first coordinate system and is determined using the antenna position ($\vec{r}_{AAS}$) and the UAV position information ($\vec{r}_{UAV}$), and where the transformation is performed using the initial array antenna orientation ($\vec{\Omega}_{AAS}^{(0)}$) and the antenna position ($\vec{r}_{AAS}$).

11. The method according to claim 9, wherein the second vector ($\hat{\rho}_{TT}$) is comprised in the determined array antenna orientation ($\vec{\Omega}_{AAS}$), where the control unit is adapted to issue an alert signal when the comparison results in a discrepancy exceeding a certain threshold, where the discrepancy comprises the error angle ($\beta_e$).

12. The method according to claim 11, wherein the determined array antenna orientation ($\vec{\Omega}_{AAS}$) comprises at least one angle and where the initial array antenna orientation ($\vec{\Omega}_{AAS}^{(0)}$) comprises at least one angle.

* * * * *

UNITED STATES PATENT AND TRADEMARK OFFICE
CERTIFICATE OF CORRECTION

PATENT NO. : 12,143,160 B2
APPLICATION NO. : 17/416256
DATED : November 12, 2024
INVENTOR(S) : Elfström et al.

It is certified that error appears in the above-identified patent and that said Letters Patent is hereby corrected as shown below:

In the Specification

In Column 5, Line 28, delete "$\vec{r}_{TT}$" and insert -- $\hat{r}_{TT}$ --, therefor.

In Column 5, Line 33, delete "$\hat{r}_{AAS}$ and the UAV position $\hat{r}_{UAV}$" and insert -- $\vec{r}_{AAS}$ and the UAV position a $\vec{r}_{UAV}$. --, therefor.

In Column 5, Line 37, delete "FAAS" and insert -- $\vec{r}_{AAS}$ --, therefor.

In Column 5, Line 51, delete "PTT" and insert -- $\hat{\rho}_{TT}$ --, therefor.

In Column 5, Line 56, delete "PTT," and insert -- $\hat{\rho}_{TT}$, --, therefor.

In Column 6, Line 34, delete "$\hat{\Omega}_{AAS}$" and insert -- $\vec{\Omega}_{AAS}$ --, therefor.

In Column 6, Line 52, delete "pry" and insert -- $\hat{\rho}_{TT}^{(O)}$ --, therefor.

In Column 6, Line 53, delete "$\vec{r}_{TT}$" and insert -- $\hat{r}_{TT}$ --, therefor.

In Column 6, Line 56, delete "$\vec{r}_{TT}$" and insert -- $\hat{r}_{TT}$ --, therefor.

Signed and Sealed this
Twenty-ninth Day of April, 2025

Coke Morgan Stewart
*Acting Director of the United States Patent and Trademark Office*

CERTIFICATE OF CORRECTION (continued)
U.S. Pat. No. 12,143,160 B2

In Column 8, Line 20, delete "$\hat{\Omega}_{AAS}$" and insert --$\vec{\Omega}_{AAS}$--, therefor.

In Column 8, Line 42, delete "$\hat{\rho}_{TT,1}=R_\iota(\alpha_{roll})R_\eta(\theta_{tilt})R_z(\varphi_{az})\hat{r}_{TT,1}$" insert --$\hat{\rho}_{TT,1}=R_\xi(\alpha_{roll})R_\eta(\theta_{tilt})R_z(\varphi_{az})\hat{r}_{TT,1}$--, therefor.

In Column 8, Line 43, delete "$\hat{\rho}_{TT,2}=R_\xi(\alpha_{roll})R_\eta(\theta_{tilt})R_z(\varphi_{az})\hat{e}_{TT,2}$" insert --$\hat{\rho}_{TT,2}=R_\xi(\alpha_{roll})R_\eta(\theta_{tilt})R_z(\varphi_{az})\hat{r}_{TT,2}$--, therefor.

In Column 9, Line 18, delete "$\hat{\Omega}_{AAS}$" and insert --$\vec{\Omega}_{AAS}$--, therefor.

In Column 9, Line 40, delete "elative" and insert -- relative --, therefor.

In Column 9, Line 44, delete "$\hat{\Omega}_{AAS}^{(0)}$" and insert --$\vec{\Omega}_{AAS}^{(0)}$--, therefor.

In Column 10, Line 15, delete "$\vec{r}_{TT}$" and insert -- $\hat{r}_{TT}$ --, therefor.

In the Claims

In Column 10, Line 50, in Claim 1, delete "$(\hat{\Omega}_{AAS}^{(0)})$," and insert --$(\vec{\Omega}_{AAS}^{(0)})$,--, therefor.

In Column 11, Line 12, in Claim 2, delete "($\hat{r}_{UAV}$)," and insert --$(\vec{r}_{UAV})$,--, therefor.

In Column 11, Line 20, in Claim 3, delete "$(\vec{r}_{TT})$," and insert -- ($\hat{r}_{TT}$) --, therefor.

In Column 12, Line 20, in Claim 9, delete "$(\vec{\rho}_{TT})$," and insert --$(\hat{\rho}_{TT})$,--, therefor.